United States Patent [19]

Koyama et al.

[11] Patent Number: 4,475,114
[45] Date of Patent: Oct. 2, 1984

[54] THERMAL HEAD RECORDING DEVICE

[75] Inventors: Masatoshi Koyama, Nara; Seiichi Tanaka, Yamatokoriyama, both of Japan

[73] Assignee: Sharp Kabushiki Kaisha, Osaka, Japan

[21] Appl. No.: 423,190

[22] Filed: Sep. 24, 1982

[30] Foreign Application Priority Data

Sep. 30, 1981 [JP] Japan .................. 56-157150

[51] Int. Cl.³ .................. G01D 15/10; H04N 1/22
[52] U.S. Cl. .................. 346/76 PH; 358/296
[58] Field of Search ............ 219/216 PH; 346/76 PH; 358/296

[56] References Cited

U.S. PATENT DOCUMENTS

| 4,264,933 | 4/1981 | Kurahayashi et al. | 358/296 |
| 4,309,712 | 1/1982 | Iwakura | 346/76 PH |
| 4,347,518 | 8/1982 | Williams et al. | 346/1.1 |
| 4,348,667 | 9/1982 | Williams et al. | 340/753 X |
| 4,409,599 | 10/1983 | Yasuda et al. | 346/76 PH |

FOREIGN PATENT DOCUMENTS

| 54332 | 2/1977 | Japan | 76 PH/ |
| 38278 | 4/1981 | Japan | 346/76 PH |

Primary Examiner—Joseph W. Hartary
Assistant Examiner—Gerald E. Preston
Attorney, Agent, or Firm—Birch, Stewart, Kolasch and Birch

[57] ABSTRACT

A thermal head recording device includes a thermal head adapted to print a sheet, a source of information alternately producing coded image signal having an arbitrary length and coded EOL signal, decoder for decoding the coded image signal and coded EOL signal into image signal having a predetermined length and EOL signal, respectively. The image signal is transmitted to the thermal head in response to a driving pulse produced from driving pulse generator. The driving pulse generator includes a measuring circuit for measuring cycle length between two consecutive EOL signals, a circuit for detecting temperature of the thermal head, a circuit for determining pulse duration based on both the cycle length between two consecutive EOL signals measured by the measuring circuit and the temperature of the thermal head, a circuit for producing at least one reference pulse having a predetermined frequency, and a circuit for producing a driving pulse having a frequency determined by the reference pulse producing circuit and a pulse duration determined by the determining circuit.

7 Claims, 8 Drawing Figures

THERMAL HEAD RECORDING DEVICE

BACKGROUND OF THE INVENTION

1. Field of the invention

The present invention relates to a thermal head recording device for use in a facsimile, a line printer or the like.

2. Description of the Prior Art

The thermal head recording device generally includes, as shown in FIG. 1, a thermal printer 1 having a plurality of heat generating elements 2 aligned horizontally in a line. The heat generating elements 2 are connected to a driver 3 which provides a binary-coded signal defined by a combination of numerals "0" and "1" to the heat generating elements 2. For example, if the driver 3 provides a binary-coded signal (111 ... 111) with all digits being "1", all the heat generating elements 2 are actuated to effect recording by way of printing on a sheet to be recorded that moves pass the heat generating elements 2 in a direction indicated by an arrow. In this case, the sheet 4 is printed with a solid line comprising densely plotted dots. Therefore, by changing the combination of numerals in the binary-coded signal, it is possible to print not only the solid line, but also any broken line. After printing one line, the sheet 4 advances upwardly as indicated by an arrow in FIG. 1 for a predetermined pitch, ready for printing the next line. The driver 3 receives the binary-coded signal for one line alternately from memories A and B through a switch SW1 in a synchronized manner with the advance of the sheet 4, such that the memory A supplies binary-coded signal to the driver 3, e.g., for the odd lines and the memory B for the even lines.

The thermal head recording device further includes a receiver 5 which receives an image information in a coded form from an information transmission line 6, such as a telephone line in the case of facsimile. The receiver 5 decodes the coded image information into binary-coded signal and supplies the binary-coded signal of one line alternately to the memories A and B through a switch SW2. A signal transmission from the information transmission line 6 to the thermal printer 1 is further described below in connection with FIG. 2.

As shown in the first row of FIG. 2, the coded image information transmitted along the transmission line 6 includes image codes and EOL (end of line) codes occurring alternately. One image code includes one or more codes carrying information of one line. For a solid line, or a blank line, the image code includes a very simple and short code. Contrary, if one line is a complicated broken line, the image code includes many codes. Therefore, the length of one image code varies depending on the image to be printed. Upon receipt of one image code, the receiver 5 decodes the image code into binary-coded signal having a predetermined number of bits. For example, if the received image code is a simple code designating a solid line, the receiver 5 produces a binary-coded signal (111 ... 111) with all digits being "1". Contrary, if the received image code is a simple code designating a blank line, the receiver 5 produces a binary-coded signal (000 ... 000) with all digits being "0". Furthermore, if the received image code is a combination of many codes designating a complicated broken line, the receiver 5 produces a binary-coded signal having digits in combination of "0" and "1". The manner in which the image information is coded and decoded is based on "Recommendations" by CCITT (THE INTERNATIONAL TELEGRAPH AND TELEPHONE CONSULTATIVE COMMITTEE).

As understood from the foregoing, the length of each image code differs from other image codes, however, the length of each binary-coded signal is the same as other binary-coded signals.

The binary-coded signals as decoded by the receiver 5 are stored in the memories A and B and then are used for printing in the follow manner. For example, as shown in FIG. 2, a binary-coded signal corresponding to (N−1)th line is stored in the memory A. Then, upon receipt of the EOL code at a moment T1, the receiver 5 starts to receive image code of Nth line which is decoded to binary-coded signal and is stored in the memory B. Furthermore, immediately after the moment T1, the binary-coded signal of (N−1)th line stored in the memory A is fed to the driver 3 for effecting the printing in a predetermined sequence. The printing of (N−1)th line completes at a moment T2. The operation carried out in a time interval T1-T3 is understood as one cycle of operation in which decoding and memorizing for one line, e.g., Nth line, are carried out by the receiver 5 and the memory A or B, and at the same time, the printing of one line, e.g., (N−1)th line, is carried out by the driver 3 and the thermal head 1.

The next cycle of operation starts upon receipt of the next EOL code at a moment T3. At the moment T3, the receiver 5 starts to receive image code of (N+1)th line which is decoded to binary-coded signal and is stored in the memory A. Furthermore, immediately after the moment T3, the binary-coded signal of Nth line stored in the memory B is fed to the driver 3 for effecting the printing in a predetermined sequence. The printing of Nth line completes at a moment T4.

Thereafter, another cycle of operation is carried out upon receipt of the next EOL code at a moment T5. In this manner, a number of cycles of operations are carried out, thereby establishing a plane image as the horizontal line images align vertically.

In the above description, since the length of one image code differs from other image codes, the time length of one cycle of operation is not constant. In other words, a time interval T1-T3 is not equal to a time interval T3-T5. Whereas, since the length of one binary-coded signal is equal to the other binary-coded signals, the printing time T1—T2 for printing the (N−1)th line and the printing time T3-T4 for printing the Nth line are equal to each other.

From the above facts, it can be said that non-printing periods T2-T3 and T4-T5 vary in each cycle of operation.

During the non-printing periods T2-T3 and T4-T5, the heat generating elements 2 are maintained deactivated and, therefore, it can be said that during such non-printing periods the heat generating elements 2 are cooled down, resulting in cooling down of the surrounding atmosphere. Since the temperature of the surrounding atmosphere is in relation to the darkness, or contrast, of printing such that the print becomes dark as the surrounding temperature becomes high and, on the contrary, the print becomes light as the surrounding temperature becomes low, the temperature change of the surrounding atmosphere results in uneven darkness of the printed sheet. Such an uneveness is particularly apparent between the starting portion and the ending portion of the printed sheet. For example, under such circumstances that the surrounding temperature is 0° C.

and that pulse width of each pulse in the binary-coded signal is 1.2 ms with the length of one cycle of operation being 100 ms and that the printing period is 10 ms, the darkness of the printed portion showed 50% difference.

In order to improve the unevenness of the darkness of the printed sheet, approaches have been made and one of which is disclosed in Japanese Patent application laid open to public (Tokkaisho) No. 52-80846. According to the thermal head recording device disclosed in Tokkaisho No. 52-80846, an auxiliary heat source is provided in addition to the heat generating element that effects the printing so that the heat generating element as well as the surrounding atmosphere is maintained in a desired temperature. According to this arrangement, it is necessary to provide the auxiliary heat source and its associated parts such as a power source for the auxiliary heat source and a control circuit for controlling the auxiliary heat source, resulting in bulky in size and complicated in arrangement.

Another prior art thermal head recording device is disclosed in U.S. Pat. No. 3,577,137 in which a voltage to be supplied to the heat generating element is controlled to generate a predetermined temperature from the heat generating element. According to this arrangement, it is necessary to further provide a circuit for controlling the voltage level resulting in complication of the circuit, and furthermore, such an arrangement is not suitable for the control in digital form.

SUMMARY OF THE INVENTION

The present invention has been developed with a view to substantially solving the above described disadvantages and has for its essential object to provide an improved thermal head recording device in which the heat generating element can be heated, when actuated, to a required temperature regardless of the temperature of the surrounding atmosphere, so as to provide a uniform contrast, or darkness of the printed sheet.

It is also an essential object of the present invention to provide a thermal head recording device of the above described type without employing any auxiliary heat source and without changing the level of the voltage to be applied to the heat generating element.

In accomplishing these and other objects, a thermal head recording device has a thermal head adapted to print a sheet, a source of information alternately producing a coded image signal having an arbitrary length and a coded EOL signal, decoder means for decoding the coded image signal and coded EOL signal into an image signal having a predetermined length and an EOL signal, respectively, means for transmitting the image signal to the thermal head for effecting the printing by a driving pulse, and means for generating the driving pulse. According to the present invention, the driving pulse generating means comprises, means for measuring cycle length between two consecutive EOL signals, means for determining pulse duration based on the measured by the cycle length between two consecutive EOL signals measuring means, means for producing at least one reference pulse having a predetermined frequency, and means for producing a driving pulse having a frequency determined by the reference pulse producing means and a pulse duration as determined by the determining means.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
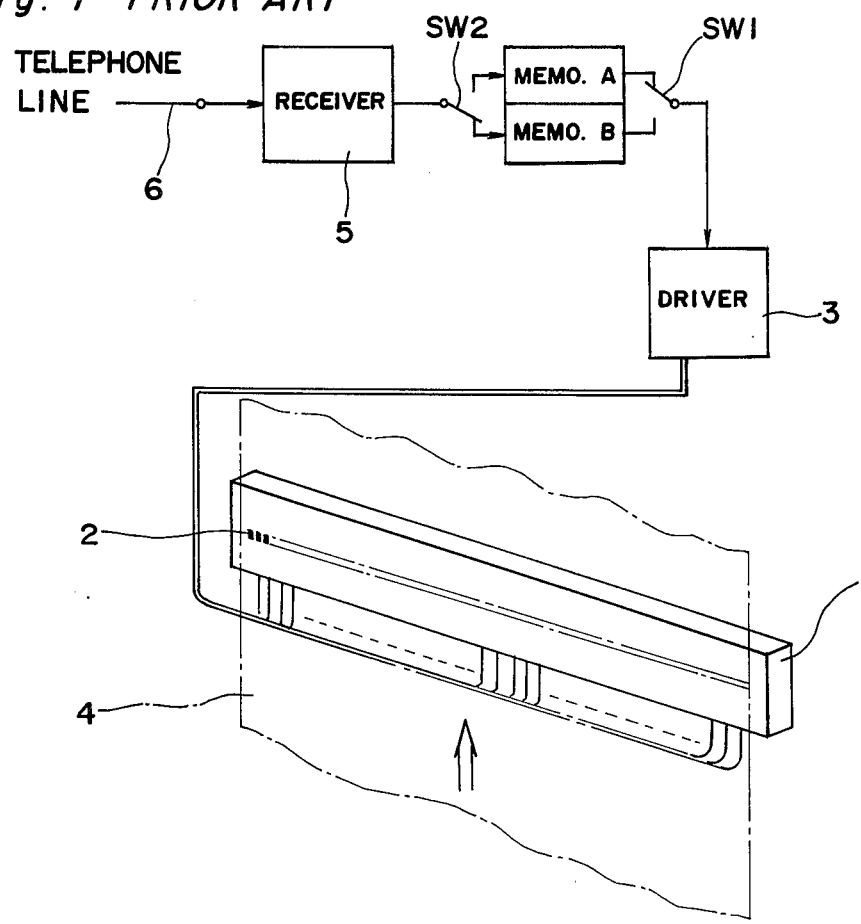
FIG. 1 is a block diagram showing a general arrangement of a thermal head recording device.
Figure 2:
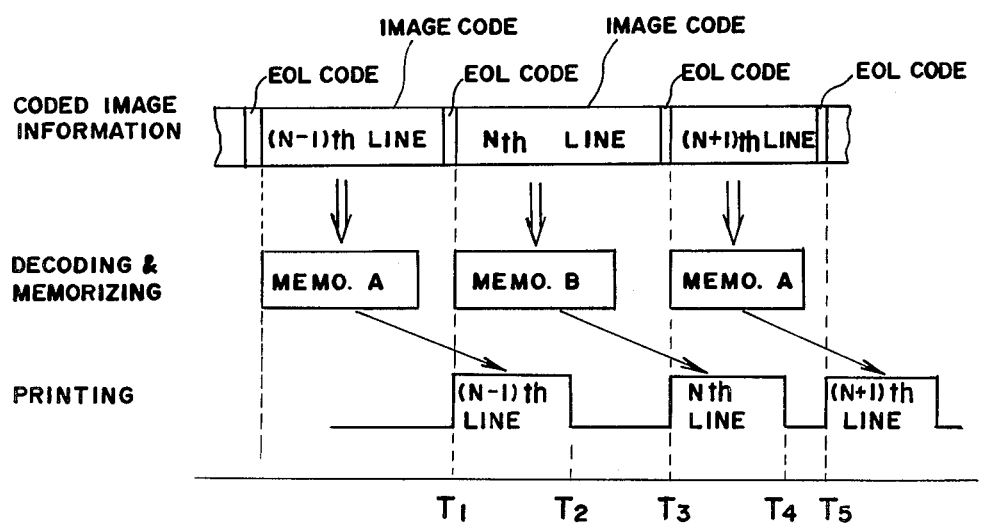
FIG. 2 is a time chart showing a sequence of operation carried out by the thermal head recording device of FIG. 1.
Figure 3:
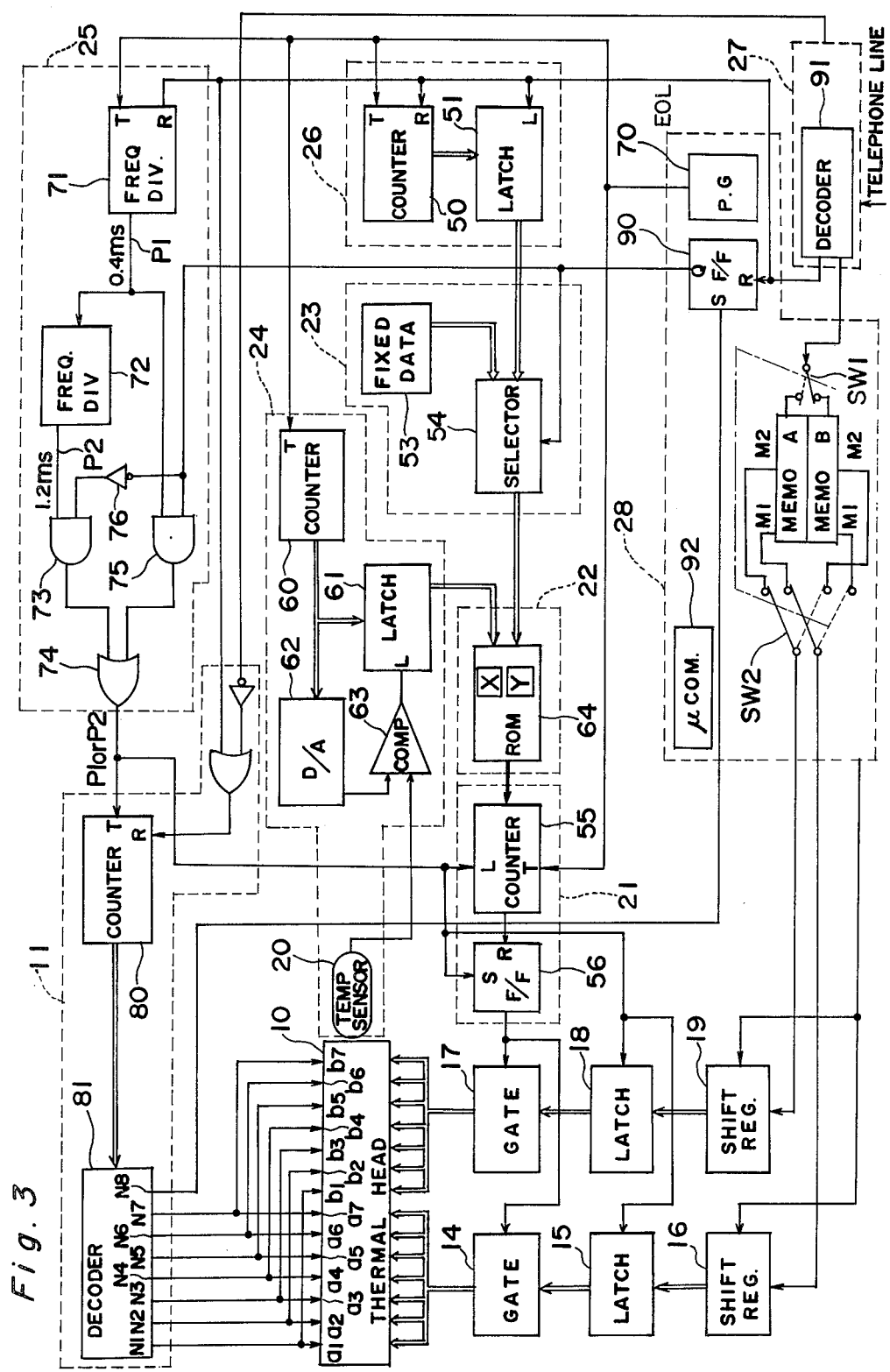
FIG. 3 is a block diagram of a thermal head recording device according to one preferred embodiment of the present invention.

Referring to FIG. 3, a thermal head recording device according to a preferred embodiment of the present invention is shown as employed in a facsimile. The thermal head recording device shown comprises a receiver 27 which receives coded image information from a telephone line. As mentioned above in connection with FIG. 2, the coded image information comprises image codes and EOL (end of line) codes occurring alternately. By a decoder 91, the image code of each line is decoded into a binary signal having a predetermined number of bits, e.g., 1728 bits, and the EOL code is decoded into an EOL signal. The binary-coded signal thus decoded by the decoder 91 is applied alternately to memories A and B by one line through a switch SW1. The switch SW1 and the memories A and B are provided in a control circuit 28 which further includes a double-throw switch SW2, a pulse generator 70, a flip-flop 90 and a microcomputer 92. Each of the memories A and B has two outputs M1 and M2. From the output M1, the memorized binary-coded signal is read out sequentially from the first bit, and from the output M2, the memorized binary-coded signal is read out sequentially from the 897th bit. The outputs M1 and M2 of the memories A and B are connected through the switch SW2, respectively, to shift registers 16 and 19, each capable of storing 128 bits. The switches SW1 and SW2 actuate in a synchronized manner with each other and change their position from that shown by a solid line to that shown by a broken line, or vice versa, each time the EOL signal is produced. When the switches SW1 and SW2 are in the position shown by the solid line, the binary-coded signal produced from the decoder 91 is stored in the memory B and, during the same period, the binary-coded signal previously stored in the memory A is read out and sent to shift registers 16 and 19. Since the shift registers 16 and 19 are each capable of storing 128 bits, the microcomputer 92 intercepts the sending of binary-coded signal from the memory A when the first 128 bits are sent to each of the shift registers 16 and 19. When the first 128 bits are further transferred from each of the shift registers 16 and 19 to latches 15 and 18, respectively, the microcomputer 92 again starts sending the next 128 bits from the memory A to the shift registers 16 and 19. Therefore, the binary-coded signal of one line from the memory A is sent intermittently in 7 times to the shift registers 16 and 19. The sending of the binary-coded signal of one line from the memory B to the shift registers 16 and 19 is carried out in a similar manner.

Figure 4:
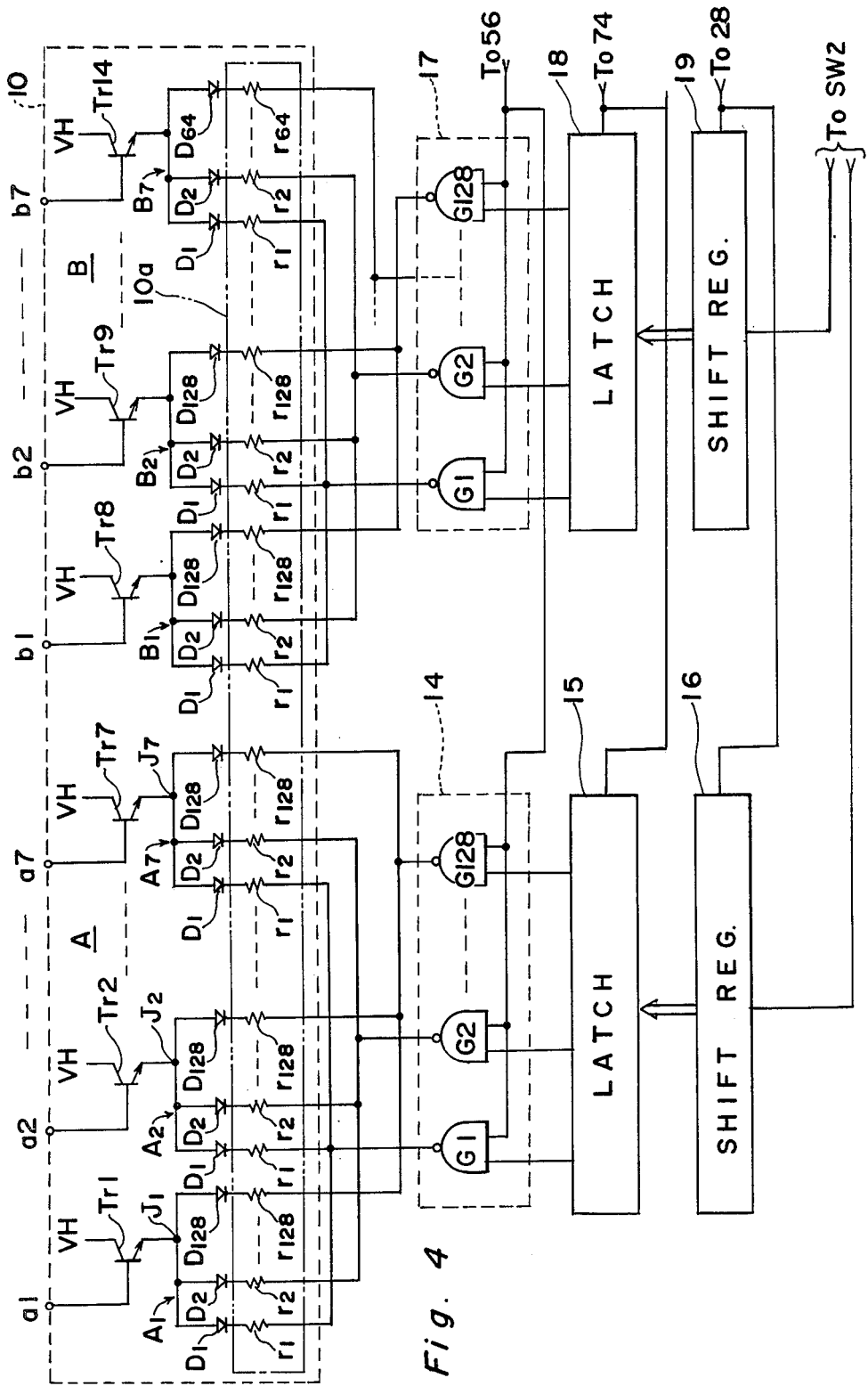
FIG. 4 is a circuit diagram showing a portion of a thermal head of FIG. 3 in detail and its associated parts.

From each of the latches 15 and 18, the 128-bit signal is applied to gates 14 and 17, respectively. Each of the gates 14 and 17 comprises, as shown in FIG. 4, 128 NAND gates G1 to G128. The gates 14 and 17 are connected to a thermal head 10. The timed relation in which the latches 15 and 18 store the 128-bit signal, and the gates 14 and 17 open will be described in detail later.

Referring to FIG. 4, the thermal head 10 is defined by a ceramic substrate 10a on which a plurality, such as 1728, of electric resistive elements are provided densely in a row. These electric resistive elements are designated by reference characters r1, r2, . . . r128 repeatedly and reference characters r1, r2, . . ., r64. Each of the resistive elements r1, r2, . . . has a configuration of a tiny dot and is formed by the method of deposition. According to one example, there are 8 dots of resistive elements per 1 millimeter, and in total, there are 1728 dots aligned in a row so as to correspond to the width of A4 size paper. It is to be noted that each of these resistive elements r1, r2, . . . define a heat generating element.

The resistive elements aligned in a row are divided into two classes A and B in which the class A contains 896 resistive elements from the left most end resistive element in FIG. 4, and the class B contains the remaining 832 resistive elements. Each class is further divided into 7 groups such that the first 128 resistive elements from the left most end resistive element in FIG. 4 define a first group A1, and the next 128 resistive elements define a second group A2. In this manner, the resistive elements aligned in a row is divided into 14 groups A1–A7 and B1–B7 (The last group B7 only contains 64 resistive elements.).

As shown in FIG. 4, in the first group A1, a diode, e.g., D1, is connected in series to each resistive element, e.g., r1, and all the diodes D1–D128 in the first group A1 are connected to each other at a junction J1 which is further connected to an emitter of a transistor Tr1. The diodes D1–D128 can be also provided on the substrate 10a by way of deposition.

In a similar manner, the resistive elements in the other groups A2–A7 and B1–B7 are connected in series to diodes, and the diodes in each groups are further connected to a junction. Each junction is further connected to an emitter of a transistor. Since there are 14 groups, it is understood that the thermal head 10 includes 14 transistors Tr1 to Tr14. The collectors of the 14 transistors Tr1 to Tr14 are connected to a constant voltage source VH and the bases of the same are connected to terminals a1, a2, . . . , a7, b1, b2, . . . , and b7 of the thermal head 10. These terminals a1 to b7 are connected to 7 outputs N1–N7 of a decoder 81 (FIG. 3) in a manner which will be described later.

Furthermore, as shown in FIG. 4, the first resistors r1, r1, r1, . . . of the respective groups A1–A7 in class A are connected to each other and further to an output of the NAND gate G1 provided in the gate circuit 14. In a similar manner, the second resistors r2, r2, r2, . . . of the respective groups A1–A7 in class A are connected to each other and further to an output of the NAND gate G2. Likewise, other resistors of the class A are connected to corresponding NAND gate in the gate circuit 14. Therefore, the last resistors r128, r128, r128, . . . of the respective groups A1–A7 in class A are connected to each other and further to an output of the last NAND gate G128.

In a similar manner to the above, the resistors in the class B are connected to corresponding NAND gate provided in the gate circuit 17. For example, the first resistors r1, r1, r1, . . . of the respective groups B1–B7 in class B are connected to each other and further to an output of the NAND gate G1 provided in the gate circuit 17.

Referring to FIG. 3, the decoder 81 is provided in a group selector 11 which further includes a counter 80. The decoder 81 has an input for receiving a signal from the counter 80 and has 8 outputs N1 to N8. The output N1 is connected to the terminals a1 and b1 of the thermal head 10, and the output N2 is connected to the terminals a2 and b2 of the thermal head 10. Similarly, other outputs N3 to N7 are connected to corresponding terminals of both classes A and B in the thermal head 10. The last output N8 is connected to a set terminal S of the flip-flop 90.

When the counter 80 is carrying zero, all the outputs N1 to N8 of the decoder 81 produce a low level signal. In this case, all the transistors Tr1 to Tr14 provided in the thermal head 10 are maintained non-conductive. When the counter 80 carries 1, the output N1 of the decoder 81 produces a high level signal and the remaining outputs N2 to N8 produce a low level signal. In this case, the transistors Tr1 and Tr8 provided in the thermal head 10 are turned to a conductive state, while the others are maintained non-conductive. In other words, when counter 80 has counted to, e.g., 1, the decoder 81 selects groups A1 and B1 causing power supply to resistive elements in the selected groups A1 and B1. Accordingly, the resistive elements r1, r2, . . . , r128 in both groups A1 and B1 are in a condition ready to allow current flow therethrough. Which of the resistive element or elements will receive current is determined by the output signal produced from the NAND gates 14 and 17. For example, if the NAND gates G1 and G2 in gate circuit 14 are producing low level signal and the NAND gate G128 in the same 14 is producing a high level signal, currents flow through resistive elements r1 and r2 in group A1 and no current flows through resistive element r128 in group A1. The length of time in which the currents flow through the resistive elements r1 and r2 is determined by the duration of a driving pulse applied to the NAND gates G1 and G2 from a flip-flop 56. A manner in which the pulse duration is controlled will be described in detail later.

As the counter 80 counts up serially, the resistive elements in groups sequentially receive power to carry out the recording by way of printing. The reset of the counter 80 is carried out either by an EOL signal or a receiving signal produced by a receiver 27.

Still referring to FIG. 3, the thermal head recording device according to the preferred embodiment of the invention further comprises a reference pulse generating circuit 25, a cycle length measuring circuit 26, a data selector circuit 23, a temperature detecting circuit 24, a pulse-width determining circuit 22, and a driving pulse generating circuit 21. Each of these circuits are described in detail below.

Figure 7:
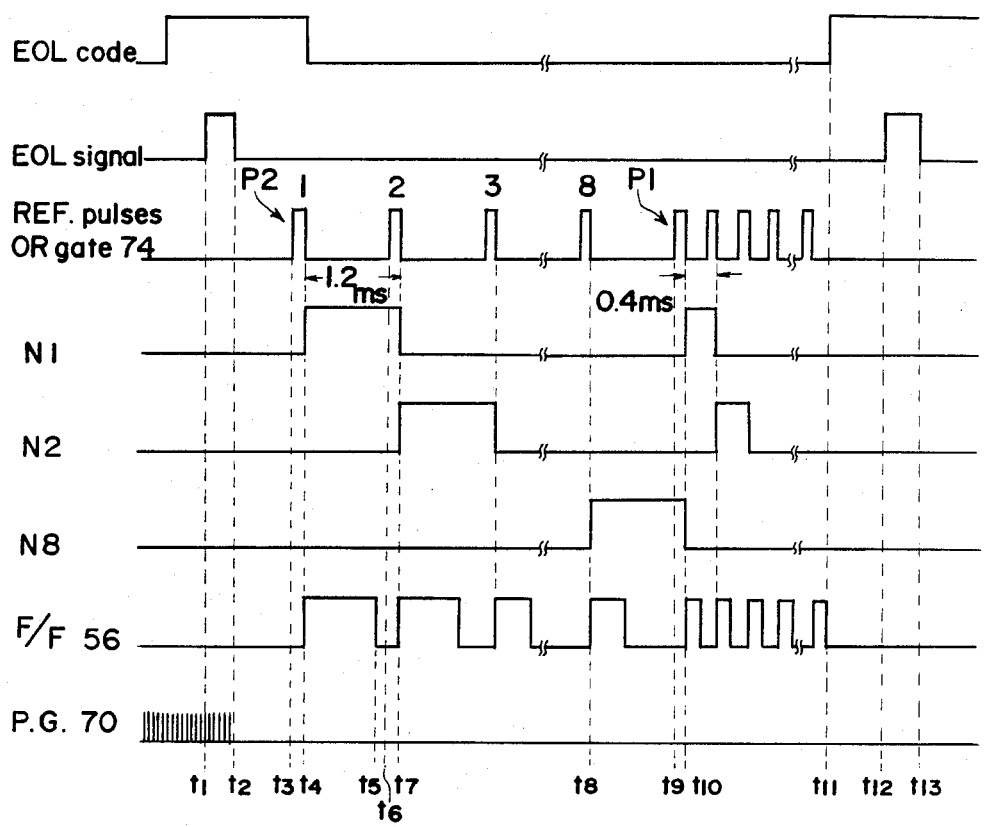
FIG. 7 is a graph showing waveforms obtained at major points in the circuit diagram of FIG. 3.

The reference pulse generating circuit 25 comprises a first frequency divider 71 having an input terminal T connected to the pulse generator 70 for receiving a train of high frequency clock pulses (FIG. 7, last row). The first frequency divider 71 also has a reset terminal R connected to the decoder 91 for receiving the EOL signal (FIG. 7, second row). When the first frequency divider 71 receives the EOL signal, it starts to divide the clock pulses from the pulse generator 70 and produces first reference pulses P1 having a pulse spacing (time between step downs of neighboring two pulses) of 0.4 ms. The output of the first frequency divider 71 is connected to a second frequency divider 72 which upon receipt of first reference pulses P1, produces second reference pulses P2 having a pulse spacing of 1.2 ms. An AND gate 73 has two inputs which are connected to the second frequency divider 72 and to an inverter 76, respectively. The inverter 76 is further connected to Q terminal of the flip-flop 90 provided in the control circuit 28. The output of the AND gate 73 is connected to an OR gate 74. Another AND gate 75 has two inputs which are connected to the first frequency divider 71 and to the flip-flop 90. The output of the AND gate 75 is connected to the OR gate 74.

When the Q terminal of the flip-flop 90 is producing a high level signal, the AND gate 75 is activated to permit the transmital of the first reference pulses P1 to the OR gate 74. Contrary, when the Q terminal of the flip-flop 90 is producing a low level signal, the AND gate 73 is activated to permit the transmital of the second reference pulses P2 to the OR gate 74. Accordingly, the OR gate 74 produces reference pulses (FIG. 7, third row) which are either pulses P1 or P2. The reference pulses P1 or P2 are applied to the counter 80, thereby the counter 80 counts up the reference pulses P1 or P2. The reference pulses are also applied to the driving pulse generating circuit 21 for effecting the start of each driving pulse in a manner described later, and also to the latches 15 and 18.

The cycle length measuring circuit 26 comprises a counter 50 having an input terminal T connected to the pulse generator 70 for receiving a train of clock pulses, and a reset terminal R connected to the decoder 91 for receiving the EOL signal. A latch 51 is provided for receiving the counted data from the counter 50 when the latch 51 receives a EOL signal to its load terminal L. Therefore, when the decoder 91 produces an EOL signal, first the latch 51 stores counted data from the counter 51 in response to the step up of the EOL signal, and thereafter, in response to the step down of the EOL signal, the counter 50 is reset to start counting from zero. Thus, the latch 51 holds data of time length between two neighboring, or consecutive, EOL signals, which time length is substantially equal to one cycle length. In other words, the latch 51 holds data indicating time length of the previous cycle, and such a data is renewed at the end of each cycle of operation. Instead of EOL signals, cycle length measuring circuit 26 can be so arranged as to measure between two consecutive line synchronizing signals, so long as the circuit 26 measures the cycle length of each line. Such signals as the EOL signals and line synchronizing signals are generally referred to as line information signals.

The data selector circuit 23 comprises a selector 54 which receives data of one cycle length from the latch 51 and fixed data from box 53 and produces either one of two data. When the selector 54 is receiving a low level signal from the Q terminal of flip-flop 90, the selector 54 selects cycle length data obtained from the latch 51. Contrary, when the selector 54 is receiving a high level signal, it selects the fixed data. The selected data is applied to the pulse-width determining circuit 22.

The temperature detecting circuit 24 comprises a temperature sensor 20 provided in the thermal head 10 for sensing the temperature of the thermal head 10, particularly the atmosphere temperature around the resistive elements. The temperature sensor 20 produces a voltage signal representing the sensed temperature. The voltage signal is applied to one input of a comparator 63. The temperature detecting circuit 24 further comprises a counter 60 having an input terminal T connected to the pulse generator 70 for receiving a train of clock pulses. The data counted by the counter 60 is applied both to a digital-to-analog (D/A) converter 62 and to a latch 61. The D/A converter 62 produces a voltage signal representing the amount counted by the counter 60. Since the counter 60 incessantly counts up, the voltage signal produced from the D/A converter 62 gradually increases. When the voltage level from the D/A converter 62 exceeds the voltage level from the temperature sensor 20, the comparator 63 produces a high level signal which is applied to a load terminal L of the latch 61, causing latch 61 to store the counted data from the counter 60. Accordingly, the data stored in the latch 61 is in relation to the present temperature of atmosphere surrounding the thermal head 10. After the latch 61 stores the counted data, the counter 60 is turned to reset condition, again starting the count up from zero. Thereafter, a similar operation is carried out to renew the data stored in the latch 61.

The pulse-width determining circuit 22 comprises a ROM 64 having areas X and Y carrying different information. In the area X, the information based on the graph 5a is stored, and in the area Y, the information based on the graph 5b is stored.

Figure 5A:
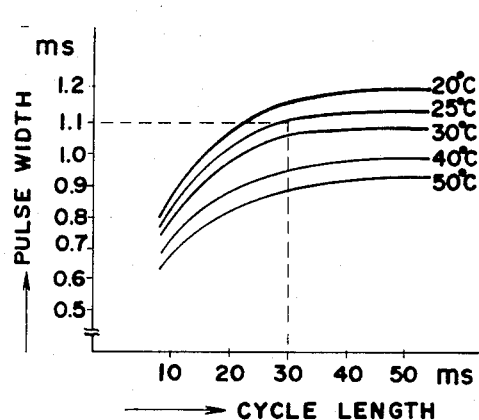
FIGS. 5a and 5b are graphs obtained empirically and showing best conditions to obtain uniform contrast, or darkness, on the printed sheet.
Figure 5B:
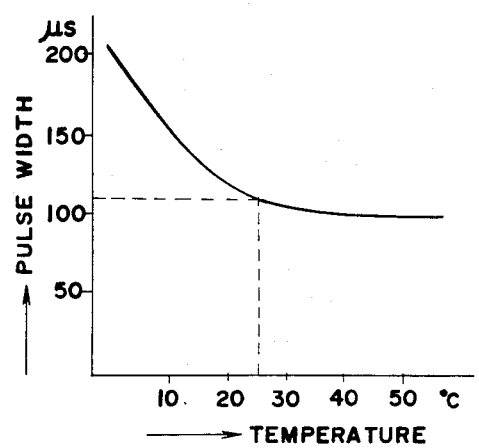

The inventors have carried out a number of tests to obtain the graphs of FIGS. 5a and 5b. In the graph of Fig. 5a, abscissa and ordinate represent, respectively, cycle length between two consecutive EOL pulses and width of a driving pulse P2, and curves are obtained under different temperatures of atmosphere surrounding the thermal head 10. The curves depicted in the graph of FIG. 5a show conditions to obtain optimum and constant contrast, or darkness, of print on a sheet. For example, when the cycle length is 30 ms and the temperature of atmosphere surrounding the thermal head 10 is 25° C., the inventors have found that the pulse width of a driving pulse P2 should preferably be 1.1 ms to obtain a desired darkness of print.

In the graph of FIG. 5b, abscissa and ordinate represent, respectively, temperature of atmosphere surrounding the thermal head 10 and width of a driving pulse P1. The curve depicted in the graph of FIG. 5b show conditions to obtain a constant temperature of atmosphere surrounding the thermal head 10. For example, if the present temperature of atmosphere surrounding the thermal head 10 is 25° C., the pulse width of a driving pulse P1 should preferably be 110 microseconds so as to shift the temperature of the atmosphere to the desired temperature.

It is to be noted that the curves in FIGS. 5a and 5b may be different for the different types thermal head. Therefore, it is understood that the graphs in FIGS. 5a and 5b are given merely to show an example.

According to the embodiment, in the area X, data of different pulse-width, e.g., from 0.5 ms to 1.2 ms are stored at different addresses, and in the area Y, data of different pulse-width, e.g., from 100 microseconds to 200 microseconds are stored at different addresses.

When the data produced from the selector 54 is the data of cycle length, the reading of the ROM 64 is carried out in the area X. Then, by using the cycle length data and the data of temperature from the latch 61, a particular address is designated in the area X and, in the designated address, a data of particular pulse-width is stored. Such a data of particular pulse-width is read out from the ROM 64 and sent to the driving pulse generating circuit 21. For example, if the measured cycle length is 30 ms, and the present temperature of atmosphere around thermal head 10 is 25° C., ROM 64 produces, according to the graph of FIG. 5a, data of pulse-width 1.1 ms.

Contrary, when the data produced from the selector 54 is the fixed data, the reading of the ROM 64 is carried out in the area Y. Then, by using the fixed data and the data of temperature, a particular address is designated in the area Y and, in the designated address, a data of particular pulse-width is stored. Such a data of particular pulse-width is read out from the ROM 64 and sent to the driving pulse generating circuit 21. For example, if the temperature of atmosphere around the thermal head 10 is 25° C., ROM 64 produces, according to the graph of FIG. 5b, data of pulse-width 110 microseconds.

The driving pulse generating circuit 21 comprises a counter 55 and a flip-flop 56. The counter 55 has an input terminal T for receiving a train of clock pulses from the pulse generator 70, and a load terminal L for receiving the reference pulses P1 or P2 from the OR gate 74. Furthermore, the counter 55 is coupled to the ROM 64. The flip-flop 56 has a reset terminal R connected to the output of the counter 55 and a set terminal S connected to the output of the OR gate 74. The output of the flip-flop 56 is connected to the gate circuits 14 and 17, more particularly, to one input of each NAND gates provided in the circuits 14 and 17.

In response to the step down of a reference pulse P1 or P2, the data of pulse-width from the ROM 64 is loaded in the counter 55 and, at the same time, the counter 55 starts counting the clock pulse. Furthermore, in response to the step down of a reference pulse P1 or P2, the flip-flop 56 is turned to set condition, thereby start producing a high level signal, i.e., a driving pulse, from its output terminal. When the counter 55 has counted a number of clock pulses corresponding to the loaded data, it supplies a pulse to the reset terminal of the flip-flop 56. Thus, the flip-flop 56 is turned to reset condition, to stop producing a high level signal from its output terminal, completing the generation of one driving pulse. Thereafter, another reference pulse P1 or P2 is applied to each of the counter 55 and flip-flop 56 to carry out a similar operation. Therefore, as the loaded data of pulse-width changes, the pulse-width of a driving pulse produced from the flip-flop 56 changes.

It is to be noted that the reference pulses P1 or P2 from the OR gate 74 are also applied to latches 15 and 18. In response to the step up of a reference pulse, the binary-coded signal from the shift registers 16 and 19 are loaded in the latches 15 and 18, respectively.

Next, the operation of the thermal head recording device of FIG. 3 is described with reference to a flow chart shown in FIG. 6 and waveforms shown in FIG. 7.

When the receiver 27 receives coded image information, such as shown in the first row in FIG. 2, the receiver 27 produces a receiving signal which is applied to the counter 80 for resetting the counter 80 to zero. The received coded image information is decoded by the decoder 91 into binary-coded signal of 1728 bits long and EOL signal which occur alternately. In practice, several trial signals precedes the binary-coded signal carrying message so as to set the thermal head recording device in an initial condition, e.g., to activate the microcomputer and to set a predetermined number initially in the counter 50. Thereafter, the microcomputer controls the thermal head recording device in a programmed steps described below.

Figure 6:
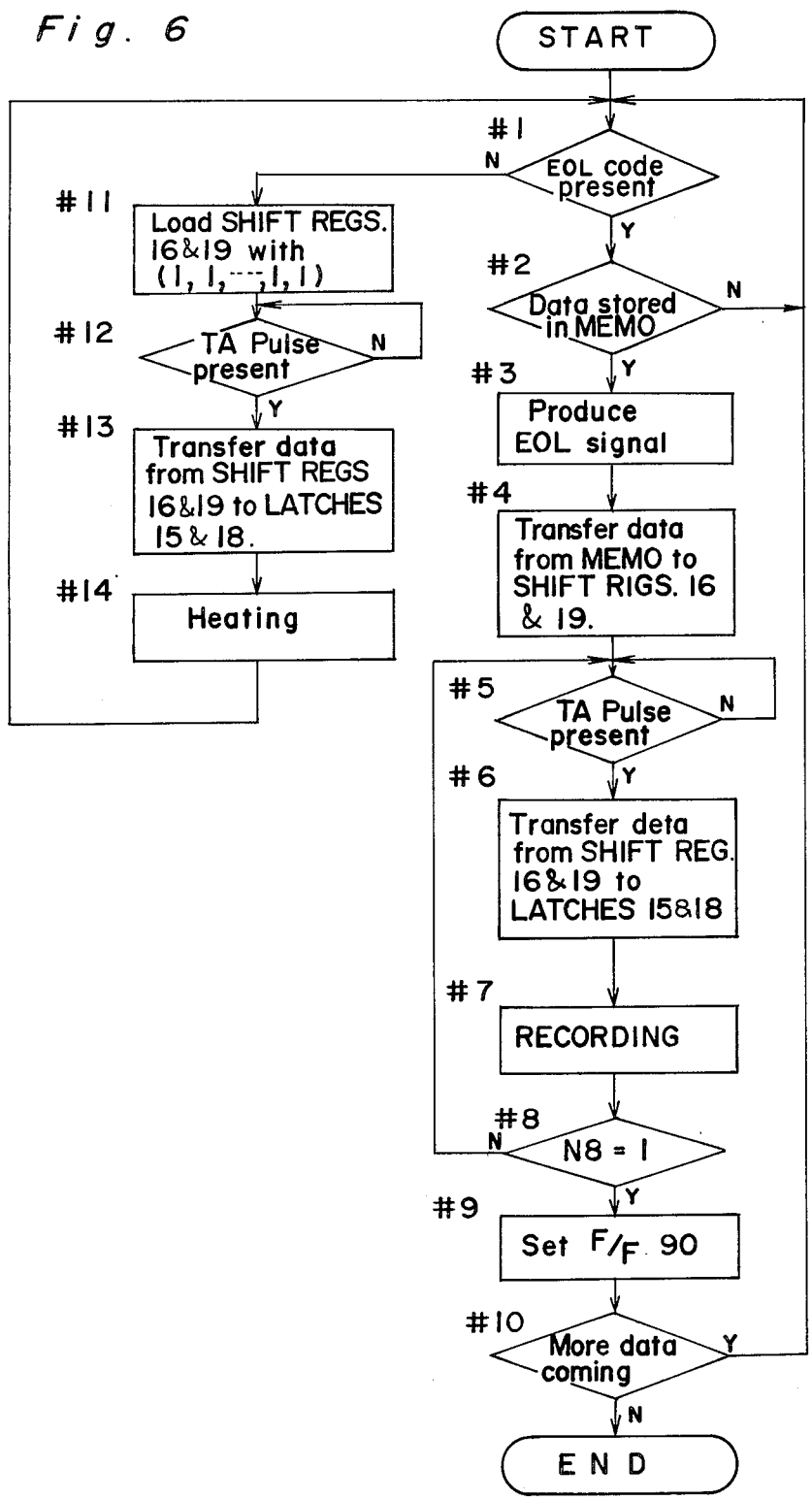
FIG. 6 is a flow chart showing a sequence of operation controlled by a microcomputer provided in the circuit diagram of FIG. 3.

First, it is discriminated whether an EOL code is present or not (step #1 shown in FIG. 6). If the EOL code is present, the microcomputer further discriminates whether any binary-coded signal is stored in either one of the memories A and B, or not (step #2). If not, the procedure returns back to the step #1. If, however, a binary-coded signal is stored in the memory A (or B), an EOL signal is produced (step #3). Accordingly, by the step up of the EOL signal at a moment t1 shown in FIG. 7, the flip-flop 90 is turned to reset condition, producing a low level signal from its Q terminal, and, at the same time, the latch 51 stores the number carried by the counter 50. Then, by the step down of the EOL signal at a moment t2, the counter 50 is turned to reset condition for restarting the counter 50 to count from an initial value such as zero. Furthermore, by the step down of the EOL signal, the first frequency divider 71 and the counter 80 are turned to reset condition. Therefore, from the moment of step down of the EOL signal, the counter 50 starts to count clock pulses from the pulse generator 70 and, at the same time, the first and second frequency dividers 71 and 72 start producing first and second reference pulses P1 and P2, respectively. Since, at this moment, the flip-flop 90 is producing from its Q terminal a low level signal, the AND gate 73 is activated to permit the transmission of the second reference pulses P2 therethrough and further through the OR gate 74. Therefore, at this moment, the reference pulse generating circuit 25 produces the second reference pulses P2 having a pulse spacing of 1.2 ms.

In the mean time, the selector 54 is so actuated by the low level signal from the flip-flop 90 as to select and send a signal of one cycle length from the latch 51 to the ROM 64, and the latch 61 is so actuated as to send data of present temperature of atmosphere surrounding the thermal head 10 to the ROM 64. Accordingly, the ROM 64 produces a data of pulse-width based on the graph of FIG. 5a. At the beginning of the operation, the temperature of the thermal head 10 is generally relatively low and, therefore, the pulse-width data produced from the ROM 64 represents a rather long pulse-width.

Furthermore, in the mean time, the binary-coded signal (1728 bits) stored in the memory A (or B) is partly (128 bits) transferred to each of the shift registers 16 and 19 (step #4). The binary-coded signal transferred in part to the shift registers 16 and 19 is referred to as a first part of the binary-coded signal, and such a transfer is carried out before the reference pulse generating circuit 25 produces a first occurring reference pulse P2, i.e., before a moment t3.

Then, by the step up of the first occurring reference pulse P2 at the moment t3, each of the latches 15 and 18 store the first part of binary-coded signal (128 bits) from the shift registers 16 and 19, respectively. When the latches 15 and 18 are loaded with the first part of binary-coded signal, the shift registers 16 and 19 are activated to receive second part of binary-coded signal from the memory A (or B).

Thereafter, by the step down of the first occurring reference pulse P2 at a moment t4, the counter 80 counts up to 1 and, accordingly, the decoder 81 produces a high level signal (FIG. 7, fourth row) from its terminal N1, causing power supply to resistive elements in the group A1 and B1. Furthermore, at the moment t4, the flip-flop 56 starts producing a driving signal (FIG. 7, seventh row) and the counter 55 starts counting the clock pulses. By the driving signal produced from the flip-flop 56, the NAND gates G1 to G128 in both gate circuits 14 and 17 are activated. Accordingly, a low level signal is produced from each of the NAND gates that receive a high level signal from the latches 15 and 18 each carrying the first part of the binary-coded signal (128 bits). By the low level signal produced from particular NAND gates currents flow through corresponding resistive elements in groups A1 and B1, thereby instantaneously generating heat from such resistive elements, and effecting printing on a sheet located adjacent the aligned resistive elements (step #7). A time duration in which the current flows through the resistive elements is determined by the pulse duration of a driving pulse produced from the flip-flop 56 in a manner described below.

After the counter 55 has counted a number of clock pulses determined by the pulse-width data obtained from the ROM 64, i.e., at a moment t5, the counter produces a signal that resets the flip-flop 56. Accordingly, the flip-flop 56 ceases producing a high level signal and, thereby completing the generation of one driving pulse. In this manner the pulse duration of each driving pulse is so controlled as to generate a desired heat from each of the resistive elements.

Before the OR gate 74 produces a second occurring reference pulse P2, the shift resistors 16 and 19 are stored with the second part of the binary-signal from the memory A (or B).

Then, by the step up of the second occurring reference pulse P2, each of the latches 15 and 18 store the second part of the binary-coded signal (128 bits) from the shift registers 16 and 19, respectively.

Thereafter, by the step down of the second occurring reference pulse P2 at a moment t7, the counter 80 counts up to 2 and, accordingly, the decoder 81 produces a high level signal (FIG. 7, fifth row) from its terminal N2, causing power supply to resistive elements in the group A2 and B2. Furthermore, at the moment t7, the flip-flop 56 starts producing a driving pulse for activating the NAND gates G1 to G128 in both gate circuits 14 and 17. Accordingly, the printing is effected by the resistive elements in groups A2 and B2 in a similar manner described above. In this case, the pulse duration of the driving pulse may be different from that of the driving pulse produced in previous operation due to the temperature change in the thermal heat 10.

The above operation is carried out repeatedly for 7 times, thereby transferring all the data stored in the memory A (or B), and thus completing the printing of one line on a sheet.

When the OR gate 74 produces the eighth occurring reference pulse P2 at a moment t8, the decoder 81 produces a high level signal (FIG. 7, sixth row) from its output N8 (step #8), thereby the flip-flop 90 is turned to set condition (step #9). Accordingly, the flip-flop 90 produces from its Q terminal a high level signal. Thus, the reference pulse generating circuit 25 produces the first reference pulse P1, and the selector 54 is so actuated as to select fixed data. Accordingly, the ROM 64 reads out a data based on the temperature of the thermal head 10 in a manner described above in connection with FIG. 5b.

While the first line is recoded in the above described manner, the next binary-coded signal (1728 bits) is being stored in the other memory B (or A) and, accordingly, the microcomputer determines that more data is coming from the telephone line (step #10).

Then, the microcomputer again discriminates whether the next EOL code is present or not (step #1). If not, the microcomputer loads a binary-coded signal (111 . . . 111) with all digits being "1" to both shift registers 16 and 19 (step #11).

Thereafter, in response to the step up of the first occurring reference pulse P1 at a moment t9, the latches 15 and 18 memorize the binary-coded singal (111 . . . 111) (step #13), and in response to the step down of the first occurring reference pulse P1 at a moment t10, the decoder 81 produces a high level signal (FIG. 7, fourth row) from its terminal N1 and, at the same time, the NAND gates are opened to permit current flow through each of the resistive elements in the groups A1 and B1. Since the driving pulse, in this case, produced from the flip-flop 56 is very short as defined by the data obtained from the ROM 64, the resistive elements are heated not so high as to effect the printing, but merely to maintain the resistive elements in a required temperature (step #14).

When the second occurring reference pulse P1 is produced, the resistive elements in the groups A2 and B2 are heated. This operation is carried out repeatedly to heat all the resistive elements not only once, but many times until next EOL code is received at a moment t11 by the receiver 27, thereby the temperature of thermal head 10 is maintained constant during the non-printing period t8–t11.

Then, upon receipt of next EOL code at a moment t11, a similar cycle of operation as mentioned above is carried out to effect the printing of second line using binary-coded data stored in the other memory B (or A). In this case, the latch 51 is holding a data of previous cycle length t2–t11.

According to the thermal head recording device of the present invention, since the pulse duration of the driving pulse P2, that effects printing, can be changed relatively to the time length of the previous cycle and also to the present temperature of atmosphere surrounding the resistive elements, a uniform contrast, or darkness, of print can be ensured.

Furthermore, since auxiliary driving pulses P1 are produced during non-printing periods, the temperature of atmosphere surrounding the resistive elements can be maintained at a desired temperature.

Moreover, since the pulse duration of such driving pulses P1 can be changed relatively to the present temperature of atmosphere surrounding the resistive elements, the maintaining of the resistive elements at a desired temperature can be carried out precisely and effectively.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. In a thermal head recording device having a thermal head adapted to print a sheet, a source of information alternately producing a coded image signal having an arbitrary length and a line information signal, decoder means for decoding said coded image signal and line information signal into an image signal having a predetermined length and a line information signal, respectively, means for transmitting said image signal to said thermal head for effecting the printing by a driving pulse, and means for generating said driving pulse, an improvement wherein said driving pulse generating means comprises:

means for measuring cycle length between two consecutive line information signals;

means for determining pulse duration based on the said cycle length between two consecutive line information signals measured by said measuring means;

means for producing at least one reference pulse having a predetermined frequency; and means for producing a driving pulse having a frequency determined by said reference pulse producing means and a pulse duration as determined by said determining means.

2. A thermal head recording device as claimed in claim 1, further comprising means for detecting the temperature of said thermal head, said pulse duration determining means determining pulse duration based on both the cycle length between two consecutive line information signals measured by said measuring means and the temperature of said thermal head detected by said detecting means.

3. A thermal head recording device as claimed in claim 2, wherein said reference pulse producing means produces a first reference pulse having a high frequency and a second reference pulse having a low frequency.

4. A thermal head recording device as claimed in claim 3, further comprising:

means for detecting printing periods and non-printing periods;

means for producing a fixed data; and means for selecting information from said measuring means when said detecting means detects a printing period, and for selecting information from said fixed data producing means; when said detecting means detects a non-printing period, and for supplying selected information to said pulse duration determining means;

said pulse duration determining means determining, when said detecting means detects a printing period, pulse duration based on both the cycle length between two consecutive line information signals measured by said measuring means and the temperature of said thermal head detected by said detecting means, and determining, when said detecting means detects a non-printing period, pulse duration based on both the fixed data from the fixed data producing means and the temperature of said thermal head detected by said detecting means;

said reference pulse producing means producing the second reference pulse when said detecting means detects a printing period, and producing the first reference pulse when said detecting means detects a non-printing period.

5. A thermal head recording device as claimed in claim 1, 2, 3, or 4, wherein said pulse duration determining means comprises a ROM.

6. A thermal head recording device as claimed in claim 1, wherein said two consecutive line information signals are EOL signals.

7. A thermal head recording device as claimed in claim 1, wherein said two consecutive line information signals are line synchronizing signals.

* * * * *